United States Patent [19]

Soong et al.

[11] 4,121,734
[45] Oct. 24, 1978

[54] PLANT WATERER

[76] Inventors: Tsai C. Soong; Jeanne F. Soong, both of 1839 Jackson Rd., Penfield, N.Y. 14526

[21] Appl. No.: 736,700

[22] Filed: Oct. 29, 1976

[51] Int. Cl.² ............................................. B67D 5/30
[52] U.S. Cl. ................................................... 222/54
[58] Field of Search ............ 222/52, 54; 47/79, 48.5; 9/317, 323, 326; 137/67; 68/17 R, 13 A

[56] References Cited

U.S. PATENT DOCUMENTS

| | | | |
|---|---|---|---|
| 1,831,476 | 11/1931 | Bennett | 222/54 |
| 2,911,988 | 11/1959 | Ravn | 137/67 |
| 3,125,255 | 3/1964 | Kaiser | 222/189 |

*Primary Examiner*—Joseph F. Peters, Jr.
*Assistant Examiner*—Norman L. Stack, Jr.
*Attorney, Agent, or Firm*—Stonebraker, Shepard & Stephens

[57] ABSTRACT

A container holds a volume of water over a plant and has an opening closed by a plug that is formed of a water-soluble material configured and composed so that the plug dissolves after a predetermined interval to let the water flow onto an area to be watered. The container can have several openings at different heights and closed by plugs that dissolve after successively longer intervals for each lower opening. Then quantities of water are admitted to the plant as the plugs dissolve after 2- or 3-day intervals so that the plant is watered periodically.

3 Claims, 5 Drawing Figures

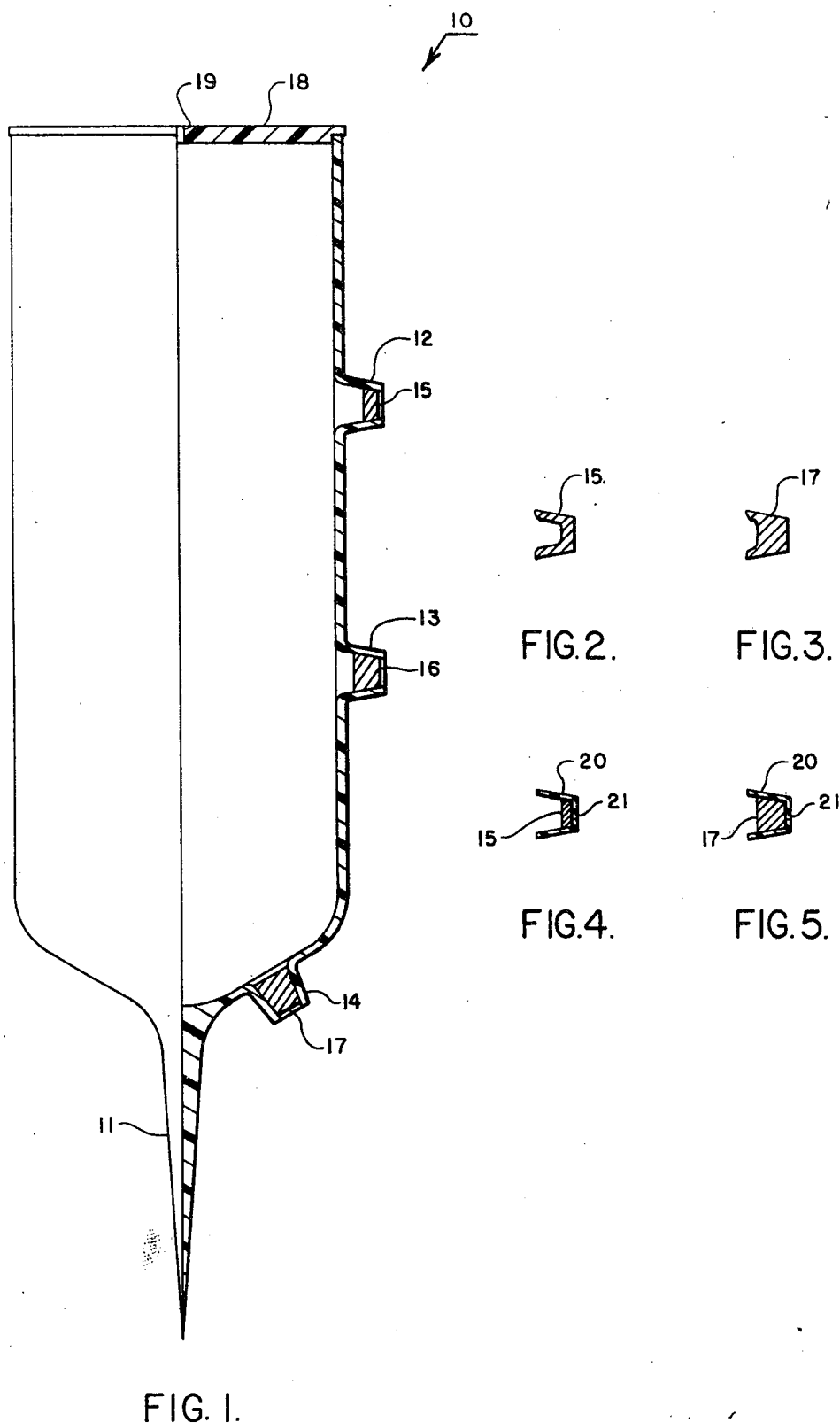

PLANT WATERER

BACKGROUND OF THE INVENTION

Watering of house plants during vacations is a common problem, and ways of continuously watering a plant at a suitably slow rate have been suggested. Drip emitters or other continuous watering devices involve many problems in reliably maintaining a slow water flow rate without plugging up or stopping.

The invention involves recognition of a simple and effective way of automatically and periodically watering plants to avoid the problems of a slow continuous water flow. The invention aims at simplicity, economy, and effectiveness in watering house plants automatically at periodic intervals without human intervention.

SUMMARY OF THE INVENTION

The inventive plant waterer uses a container for holding a volume of water mounted near a plant. The container has a water outlet opening disposed above an area to be watered, and a plug closes the opening. At least a portion of the plug is formed of a water-soluble material disposed in contact with the water, and the water-soluble material is configured and composed so that after a predetermined interval it dissolves sufficiently to open a passageway through the plug to let the water flow from the container through the opening and onto the area to be watered. The container can also have several water outlet openings disposed at different heights above the area to be watered, and plugs can be made for the openings so that the predetermined interval for dissolving the water-soluble material is longer for each successively lower one of the openings.

DRAWINGS

FIG. 1 is a partially cross-sectioned, elevational view of one preferred embodiment of the inventive plant waterer; and FIGS. 2–5 are cross-sectional views of alternative preferred embodiments of plugs for the plant waterer of FIG. 1.

DETAILED DESCRIPTION

The inventive plant waterer includes a container 10 that can be mounted or positioned over a house plant so that water can flow by gravity from container 10 onto an area to be watered. Container 10 is preferably formed of molded resin material, but can also be made of many other materials and can be formed in many sizes and shapes. A spike 11 on the bottom of container 10 is preferred for mounting, and container 10 is filled with water and positioned simply by pressing spike 11 into the soil next to the plant. Container 10 can also be supported or positioned on legs, a mounting stand, a hanger support, or any other mounting device. A cover 18 having a vent hole 19 can be used to close the top of container 10.

Container 10 has spouts or water outlet openings 12–14 formed at different heights above bottom spike 11 so that each of the water outlet openings 12–14 is at a different height above a plant to be watered. Openings 12–14 are closed with respective plugs 15–17, which are at least partly water soluble. Plugs 15–17 have a watertight fit in respective openings 12–14 to block any water flow through openings 12–14 until at least a portion of one of the plugs 15–17 dissolves in the water in container 10. Plugs 15–17 are arranged to dissolve after different predetermined intervals so that plug 15 dissolves first, followed successively by dissolution of plugs 16 and 17. When plug 15 dissolves enough to open a water passageway through opening 12, the water above the level of opening 12 pours out onto the plant for a first periodic watering. A day or two later, plug 16 dissolves sufficiently to admit all the water above opening 13 onto the plant for a second periodic watering, and finally, plug 17 dissolves enough to let the water remaining in container 10 flow onto the plant for the last periodic watering.

Container 10 can have as many water outlet openings as desired, and plugs 15–17 can be composed and configured of a variety of materials in a variety of shapes to dissolve after different intervals. One preferred way of practicing the invention is to form plug 15 to dissolve after about 2 days and make plugs 16 and 17 to dissolve respectively after about 4 days and about 6 days, but many other arrangements are possible. High accuracy is not required in the dissolving time for the plugs, because plants do not require precisely timed watering. Different volumes of water and different intervals of watering can readily be achieved in practicing the invention.

Water outlet openings 12–14 are preferably conical or formed with an internal taper for holding plugs 15–17 to make a watertight closure. There are many different ways that water outlet openings can be formed and can be closed with a suitably shaped plug to accomplish the desired results.

Plugs 15–17 can be formed of many materials that dissolve in water, and the variable dissolution times for plugs 15–17 can be accomplished by varying the plug material, dimensions, or density. Plugs can also be formed of mixtures of materials that are soluble and insoluble in water, so long as the water-soluble material is exposed to the water in container 10 in such a way that its dissolution after a period of time destroys the ability of the plug to keep the water outlet opening closed.

One preferred material for plugs 15–17 is polyvinyl alcohol, which can be made with a readily adjustable solubility in hot or cold water. Many salts, starches, gelatins, and other materials can be made into suitable plugs according to the invention, and people skilled in chemical arts can readily devise many satisfactory plugs. The commercially preferred plugs are relatively inexpensive, easily set in place to form a watertight plug, and reliably dissolved approximately after elapse of a predetermined interval on the order of a few days. Container 10 is preferably reusable by stoppering its openings 12–14 with a new set of plugs 15–17.

Plugs for the inventive waterer can be formed entirely of a water-soluble material or of a uniform mix of a water soluble material and a water-insoluble binder or matrix so that the plug forms a suitable watertight closure and dissolves uniformly. Differences in dissolving times between higher and lower plugs can then be achieved by varying the dimensions or thicknesses of the plugs as shown in comparing plug 15 of FIG. 2 with plug 17 of FIG. 3. or by varying the density of the material forming the plugs.

Plugs can also be formed of composites of water-soluble and water-insoluble materials as shown in FIGS. 4 and 5. A plug body 20 can be formed of a water-insoluble material, such as rubber or an elastomeric resin to form a watertight fit with an outlet opening in container 10, and body 20 can have a hole 21 that is blocked or closed by a water-soluble disk or plug that is pressed into place in an interference fit or glued in place over hole 21. Different dissolving times can be predetermined by varying the thickness of the water-soluble disk or plug as shown by comparing disk 15 of FIG. 4 with disk 17 of FIG. 5. Also, plug bodies 20 can have a variety of shapes, so long as they position the water-soluble material in contact with the water in container 10.

People skilled in the art will appreciate the many ways that containers can be formed and mounted for maintaining a volume of water over a plant and will understand the many ways that suitable plugs can be made to dissolve after varying lapses of time for periodic or delayed watering of a plant.

What is claimed is:

1. A plant waterer for automatically and periodically watering a plant, said plant waterer comprising:
   a. a container for holding a volume of water;
   b. means for mounting said container of water in the region of said plant;
   c. said container having a plurality of water outlet openings disposed at different heights above an area to be watered;
   d. a plurality of plugs respectively closing each of said openings;
   e. at least a portion of each of said plugs being formed of a water-soluble material disposed in contact with said water;
   f. said water-soluble material being configured and composed so that after a predetermined interval, said water-soluble material in any one of said plugs dissolves sufficiently to open a passageway through said one plug to let said water flow from said container through the one of said openings closed by said one plug and onto said area to be watered; and
   g. said predetermined interval for dissolving said water-soluble material for each of said plugs for said openings is longer for each successively lower one of said openings.

2. The plant waterer of claim 1 wherein each of said plugs is formed entirely of said water-soluble material.

3. The plant waterer of claim 1 wherein each of said plugs has a body fitting said opening and formed of a material insoluble in water, said body has a hole, and said water-soluble material is positioned to close said hole.

* * * * *